March 22, 1932. J. F. OHLER 1,850,331
POSITIVELY ACTUATED GRINDING WHEEL FEED FOR
SAW SHARPENING MACHINES AND THE LIKE
Filed Sept. 22, 1928 4 Sheets-Sheet 1
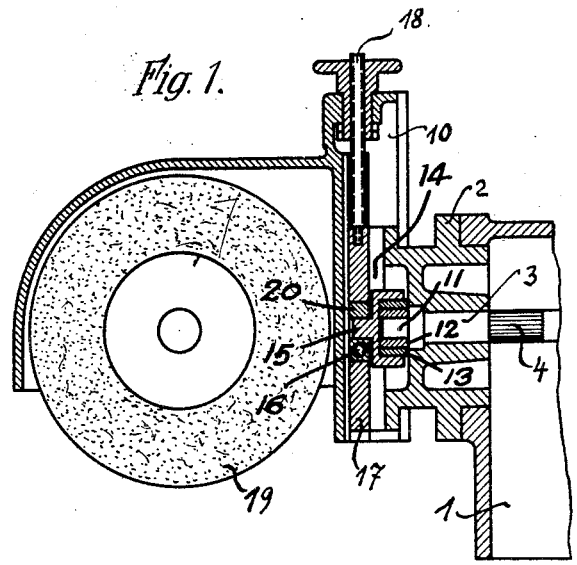
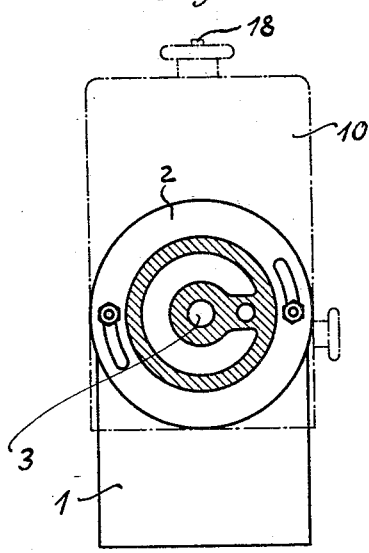
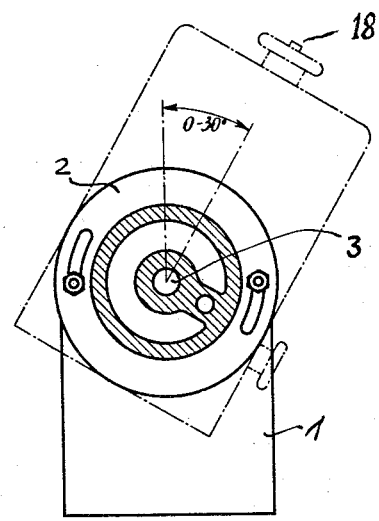
Inventor
Joh. Friedrich Ohler
B. Singer, Atty.

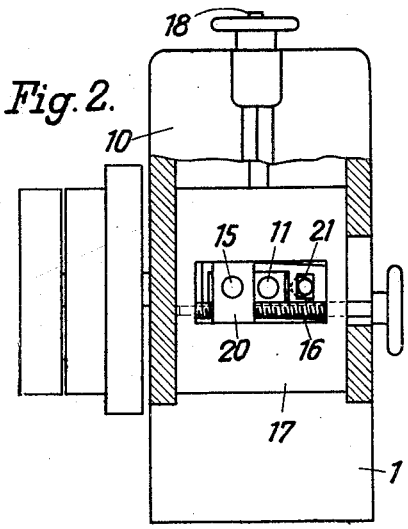
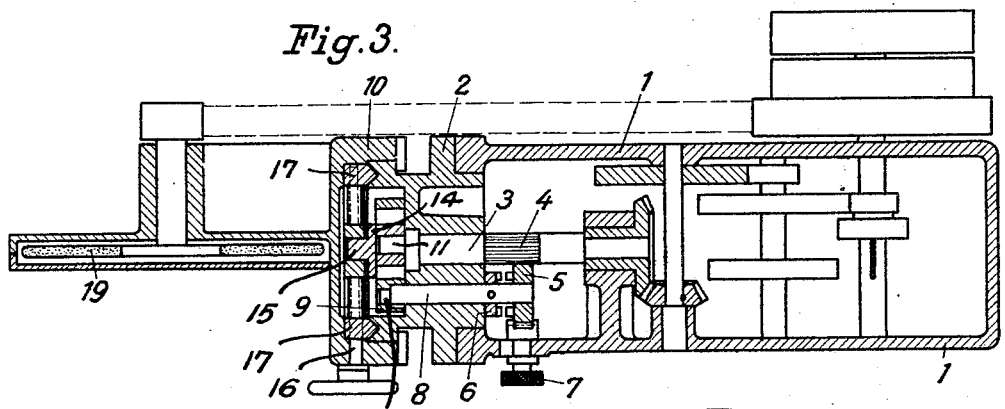
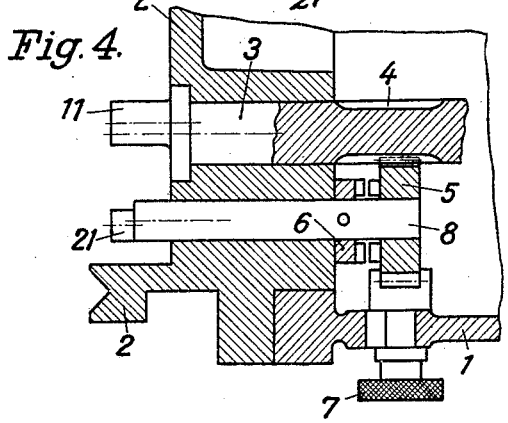
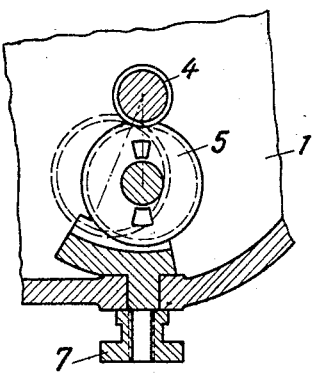

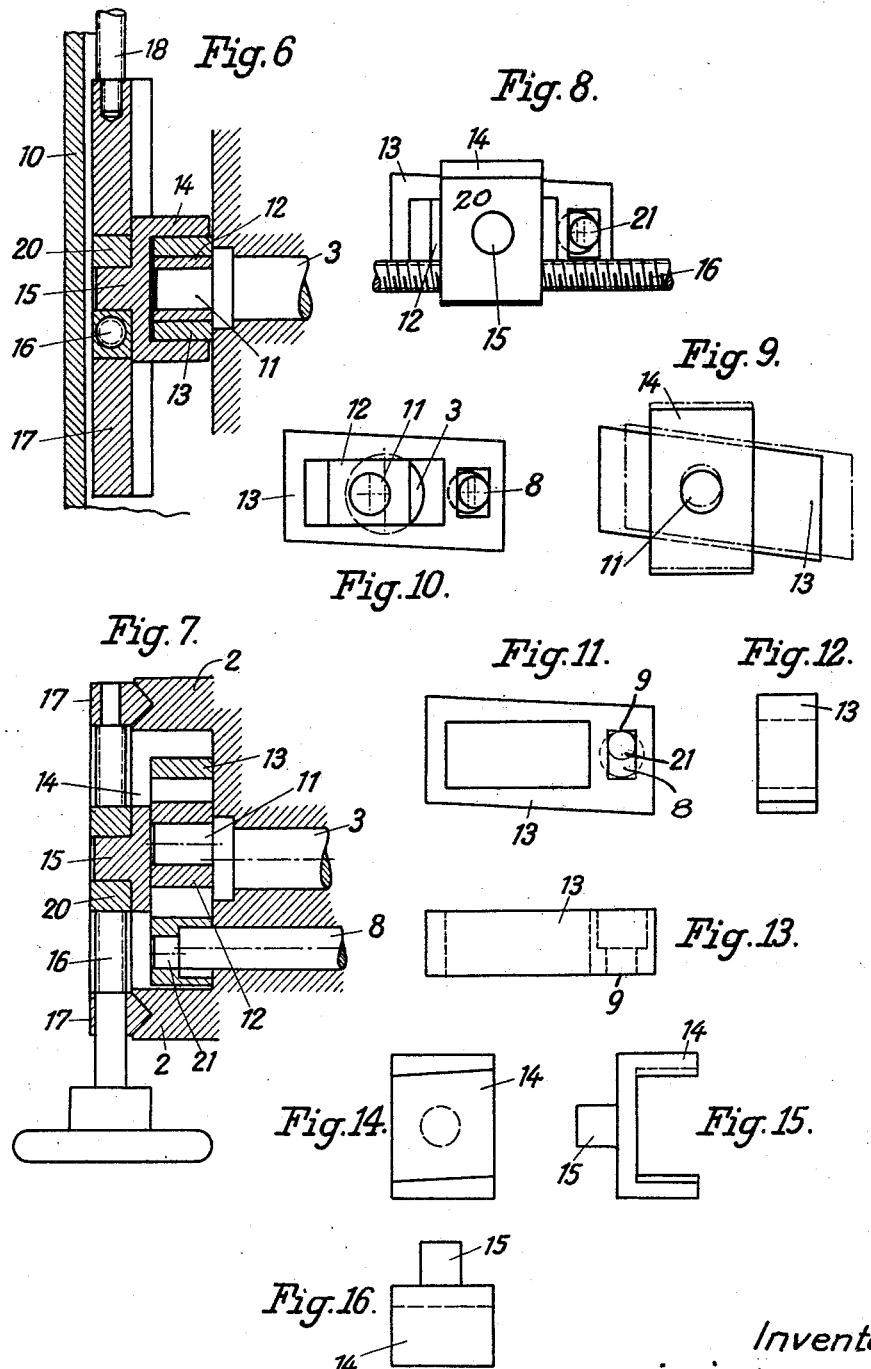

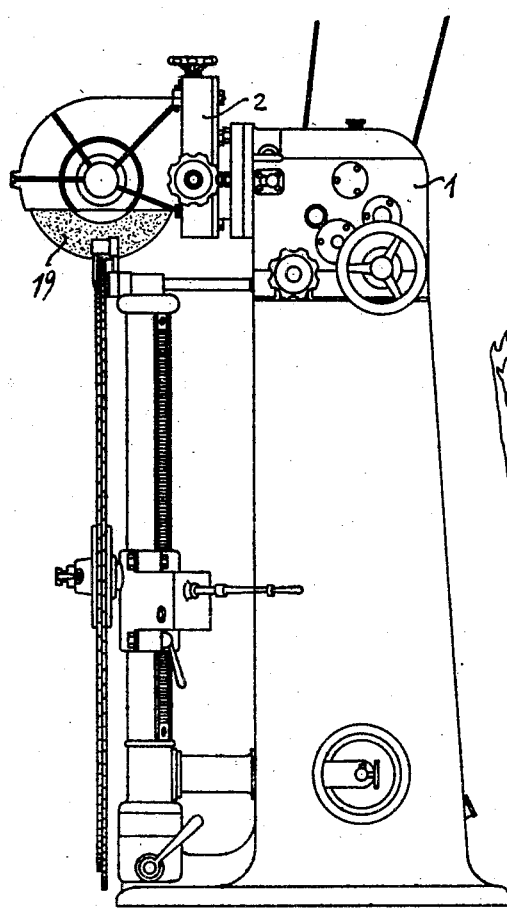
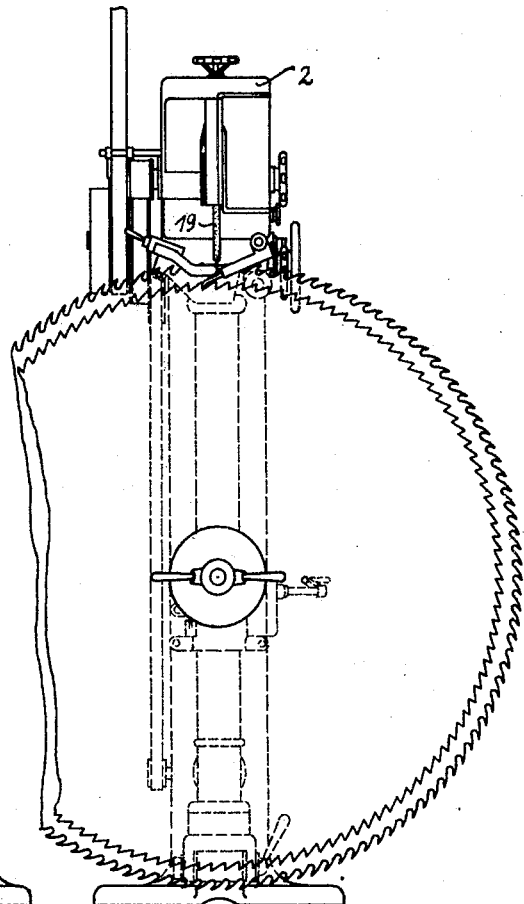

Patented Mar. 22, 1932

1,850,331

UNITED STATES PATENT OFFICE

JOHANN FRIEDRICH OHLER, OF REMSCHEID-VIERINGHAUSEN, GERMANY

POSITIVELY ACTUATED GRINDING WHEEL FEED FOR SAW SHARPENING MACHINES AND THE LIKE

Application filed September 22, 1928, Serial No. 307,581, and in Germany January 18, 1928.

Hitherto, when it was desired to form on cold circular saws consecutive pairs of teeth comprising a higher attacking cutting tooth and a lower follow-through cutting tooth, at least two working operations were necessary on the saw sharpening machine. According to this invention a saw sharpening machine has been produced, which renders it possible, to form the unequal teeth mentioned above on such a cold saw blade in their natural succession and in a single working operation. For this purpose the grinding wheel must have a slightly deeper stroke for each lower follow-through tooth than for treating the higher attacking tooth. The requisite periodical alteration in stroke from tooth to tooth is effected in the present invention by a branch drive from the main drive of the machine, as hereinafter more specifically described.

The drawings illustrate as an example one form of construction of the invention. Figs. 1 to 3 show three sectional views of the machine head carrying the grinding wheel. Fig. 4 is a detail sectional view on a larger scale showing the connection between the branch drive and the main drive. Fig. 5 is a cross-section through Fig. 4. Figs. 6 and 7 are detail sections showing the actual position of the machinery, by which the grinding stroke is periodically influenced by the branch drive. Figs. 8 to 16 are detailed views of the driving oscillator of the grinding wheel stroke, which may be regulated to one's liking. Fig. 17 is a side elevation of the machine in the act of operating on a circular saw. Fig. 18 is a front elevation of the same. Figs. 19 and 20 are vertical, sectional views of the housing head and its connections showing the mounting of the housing head, so that it may be turned and adjusted in inclined position.

On the main machine frame 1 the housing head carrying the grinding wheel 19 is mounted in the known manner so, that it may be turned and adjusted in inclined position. The main shaft 3 of the drive which forms the center on which the housing head turns is provided with a tooth gearing 4, into which the tooth wheel 5 of the new branch drive engages. Said wheel 5 is mounted on the shaft 8, which shaft is parallel with the shaft 3 and has its bearing in the head 2. The tooth wheel 5 is capable of being shifted on the shaft 8 by means of the handle 7, so that in rotating, it entrains the shaft 8 by means of the clutch 6 or not, as the case may be. On the outer end of the shaft 8 is a circular eccentrically arranged pin 21 which operates in a slot 9 of the oscillator 13, and actuates the latter, as will be understood. The oscillator 13 is slidable on the slide block 12, and the latter is rotatably mounted on the eccentric pin 11 of the main shaft 3. The oscillator 13 carries in turn the claw-shaped slide 14 which has a cylindrical pin 15 projecting from its outer side. The latter passes through the nut block 20, which is horizontally displaceable by means of the hand spindle 16, and carries the plate 17. Said plate is mounted on the body 2 for vertical movement and is capable of adjustment by means of the upright spindle 18.

The manner of operation of the new device is shown most clearly in Fig. 9. The oscillator 13 generally uses the shaft 8 as axis for its oscillating movement, the eccentric pin 11 converting the circular movement of shaft 3 into an up and down reciprocating motion of the oscillator 13. When the branch drive 5, 8, 21 is in operation, the oscillator 13 is reciprocated in a substantially horizontal direction. Said oscillator 13 has slightly inclined upper and lower longitudinal edges. Said element 13 imparts vertical reciprocating motion to the claw slide 14 to an extent corresponding with the difference in the height between the preparingly attacking teeth and that of the follow-through teeth of the cold circular saw to be ground. The ratio of transmission and the times of the movements are so arranged, that the grinding wheel 19 continuously grinds down, to a stronger degree, one saw-tooth, and then leaves the next tooth somewhat higher corresponding to the difference in height between the following-through or drag teeth and the preparingly attacking or cutting teeth, that is to say, the grinder 19 continuously revolves and the shaft 3 also continuously revolves, so that the eccentric pin 11 of shaft 3 through the elements 12, 13 and 14 causes the grindstone carrier or feed to reciprocate to a slight extent vertically. When the shaft 8 is geared to the shaft 3 through gears 4, 5 and coupling 6, the crank pin 21 of shaft 8 by reason of its engagement in the vertical slot of the element 13 causes the latter element to reciprocate longitudinally in addition to its vertical movement above stated. The upper and lower sides of element 13 are parallel with each other and are inclined and the element 14 through which element 13 passes has correspondingly inclined faces which engage those of element 13 and hence at each reciprocating movement of the element 13 the grindstone feed or carrier members 10, 17 cause the grindstone in addition to revoluble movement to also move vertically and to an extent equal to the difference between the depth of the attacking teeth and that of the follow through teeth. The grinding effect of the grindstone on the attacking teeth occurs while the grindstone is in a slightly raised position, because the higher end portion of the element 13 is then in the element 14 and the grinding effect of the grindstone on the next succeeding follow through tooth occurs when the grindstone is at the lower limit of its slightly vertical movement, because the member 14 is then at the lower portion of the member 13. The continuous manner of working of the machine, irrespective of the different heights of the teeth, saves a second setting of the machine, as it was hitherto necessary, because it successively grinds both the attacking or cutting teeth and the follow through or drag teeth, and thereby obviates a source of inaccuracies. The advantage of saving in time is of equal importance owing to its rendering possible, to work the circular saw completely finished as to its attacking or cutting teeth and also as to its follow through or drag teeth in a single uninterrupted operation without the former necessity of resetting the machine twice or still more frequently.

Having now particularly described and ascertained the nature of my said invention, and in what manner the same is to be performed, I declare that what I claim is:—

1. A positively actuated grinding wheel feed for saw grinding machines and the like, comprising a housing having a shaft to carry the grindstone or the like, a main feed shaft 3 having a crank pin, a fixed bearing for said shaft, a head provided with such bearing and on which said housing is mounted for angular movement, a controlling element 13 provided with an inclined cam surface slidably engaged with an inclined cam surface of the housing, a block 12 engaged by the crank pin of said main shaft and also slidably engaged with said controlling element, a branch drive shaft having a crank pin revoluble and also movable in a right line in a slot of the controlling element in a direction substantially at right angles to the axis of the controlling element, so that said controlling element is mounted for oscillating as well as reciprocating movement and means to connect said branch drive shaft to said main shaft for rotation therefrom and to disconnect said shafts.

2. A positively actuated grinding wheel feed as claimed in claim 1, including also a block 20, a plate 17 in which said block is movable horizontally, adjusting means connecting said plate to the housing, a claw element providing a cam surface engageable by that of the controlling member and in which claw element said controlling member is reciprocable, said claw element having a bearing pin on which said block is mounted, which bearing pin is coaxial with the main shaft.

3. A positively actuated grinding wheel feed as claimed in claim 1, including also a block 20, a plate 17 in which said block is movable horizontally, adjusting means connecting said plate to the housing, a claw element providing a cam surface engageable by that of the controlling member and in which claw element said controlling member is reciprocable, said claw element having a bearing pin on which said block is mounted, which bearing pin is coaxial with the main shaft and also including an adjusting screw for said block to adjust the latter transversely in said plate.

In testimony whereof I affix my signature.

JOHANN FRIEDRICH OHLER.